Dec. 8, 1931. O. ROMMEL 1,835,087
IDENTIFICATION PLATE FOR MOTOR DRIVEN VEHICLES
Filed Nov. 21, 1929
Fig. 1
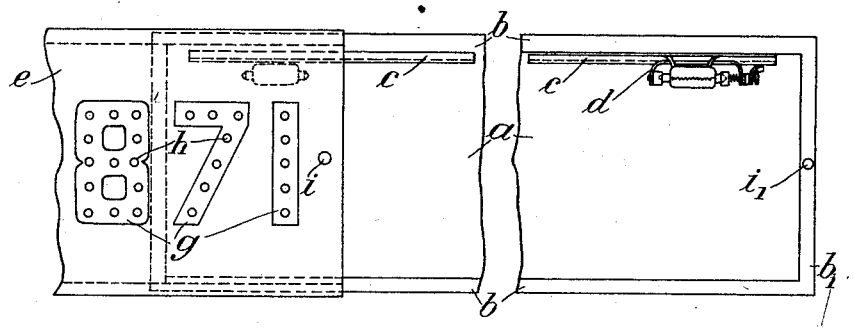
Fig. 2
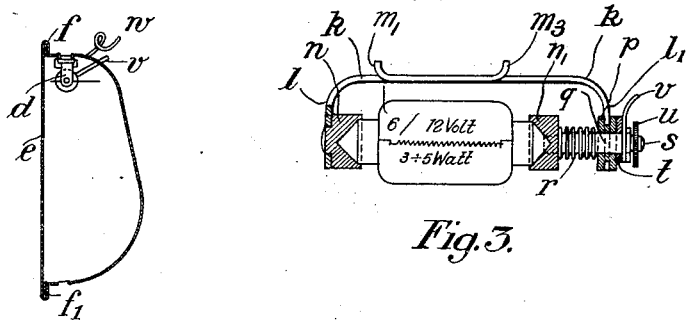
Fig. 3.
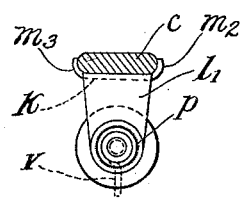
Fig. 4.
Fig. 5
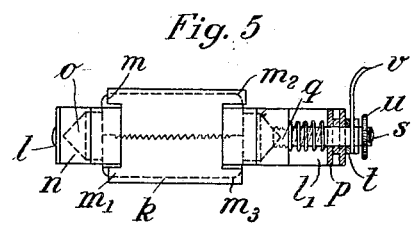

Patented Dec. 8, 1931

1,835,087

UNITED STATES PATENT OFFICE

OTTO ROMMEL, OF MERSEBURG, GERMANY

IDENTIFICATION PLATE FOR MOTOR DRIVEN VEHICLES

Application filed November 21, 1929, Serial No. 408,808, and in Germany December 1, 1928.

This invention relates to certain new and useful improvements in illuminated identification plates for motor vehicles, and has for its primary object to provide an identification plate having characters extending over the length thereof with adjustably mounted lamps shiftable to positions relatively to the identification characters for obtaining maximum illumination with the least consumption of energy.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a front elevational view of the identification plate with the plate of the casing partly moved laterally of the casing to expose a lamp and support;

Figure 2 is a vertical sectional view;

Figure 3 is a front elevational view of the terminal holder for the lamp;

Figure 4 is a side elevational view; and

Figure 5 is a top plan view.

The identification plate includes a casing of box-like form and in vertical section is of half-pear shape and comprises a sheet metal box $a$ with edge flanges $b$ and $b^1$ bent at right angles to adjacent sides of the box. A flat metal guide bar $c$ is fixed in a suitable manner on the upper small curve of the wall on which the terminal holder $d$ for the lamps pressed on resiliently, can be adjusted at any desired distance in order that the periphery of the light cones can actually intersect according to the distance of the figures or characters. The identification plate $e$ is constructed like a slide, with longitudinal flanged edges $f$ and $f^1$ folded over and engaged with the flanged edges $b$ of the box. On the outer side of the plate $e$, the characters $g$ are painted in the usual manner and provided with perforations $h$.

In order to prevent shifting or pulling out of the plate $e$ a hole $i$ and a hinge screw with thumb nut or the like are arranged on the plate behind the identification signs. In the lower wide curve of the half-pear-shaped sheet metal box $a$ holes or slots are provided, in order that the dust or dirt which has passed through the perforations $h$ of the identification signs $g$ eventually to the box $a$ can slip out.

The terminal holder $d$ (Figs. 3, 4 and 5) consists of a flat, resilient sheet metal strip $k$ with flaps $l$ and $l^1$ on both ends bent down like horns and four upwardly bent corners $m$, $m1$, $m2$, $m3$, which serve as guides and at the same time as clamping springs on the metal bar $c$. On the one upwardly bent flap $l$ of the metal strip $k$ a conically bored seat $n$ of current conducting metal is arranged, which is utilized for receiving the one point of the lamp $c$. On the opposite upwardly bent flap $l^1$ of the metal strip $k$ a sleeve $p$ of insulating material is inserted, which serves as guide bushing for the metal pin $q$. The metal pin $q$ carries on its inner end a seat $n1$ corresponding to the opposite seat $n$ for the other end of the lamp $c$. Between the seat $n1$ and the sleeve $p$ a spiral spring $r$ for clamping is pushed over the metal pin $q$, and on the threaded portions $s$ of the metal pin $q$ on the outer side of the insulating sleeve $p$ a flat nut $t$ and a nut $u$ having a fluted edge are screwed. Between the two nuts $t$ and $u$ the one current conducting wire $v$ coming from the light machine is fixed, whereas the second conducting wire $w$ is connected to the half pear-like sheet metal box $a$ in a suitable manner at displaying with accumulaor. In the one-phase system the conducting wire $w$ is omitted, as the earth is given by the putting on of the plate. Owing to the terminal holder $d$ shiftable in the guide bar $c$ it is obtained that with the generally used voltages of the sources of light, 6 or 12 volts, only two lamps of 3 or at the utmost 5 watts are quite sufficient to light the interior of the sheet metal box $a$ coated with white enamel lacquer and the inner side of the cover plate $e$ reflecting so that the perforations $h$ on the outer side of the cover $e$ are clearly recognizable at a distance of about 100 meters.

The present construction has been brought before the decisive examination posts of the government, tested by them practically for a longer time and brilliantly certified in the official files, where has been pointed out that the same, when officially introduced, would cause certainly an improvement of the security of traffic.

I claim:—

1. In a device of the character described, an open sided casing, an identification plate closing the open side of the casing and carrying perforated identification characters, illuminating means in the casing disposed rearwardly of and above the plane of the perforated identification characters, the illuminating means including a bar extending longitudinally of the casing and a lamp bracket having resilient gripping fingers engaged with the bar and longitudinally adjustable on the bar.

2. In a device of the character described, an open sided casing, an identification plate closing the open side of the casing and carrying perforated identification characters, said casing having openings in its lower end, a guide bar in the upper end of the box and lamp holders adapted to be adjusted on the guide bar with respect to the length of the identification inscription to obtain maximum illumination with a minimum of current.

3. In a device of the character described, an open sided casing, an identification plate closing the open side of the casing and carrying perforated identification characters, illuminating means in the casing disposed rearwardly of and above the plane of the perforated identification characters, the illuminating means including a bar extending longitudinally of the casing, lamp holders each including a resilient strip having bent ends for the support of a lamp and downwardly bent flaps adjustably engaged with the bar for shifting a lamp relative to the identification inscription on the plate.

In testimony whereof I affix my signature.

OTTO ROMMEL.